Dec. 1, 1959 R. F. LOOMIS 2,915,338
CONVEYING APPARATUS
Filed Dec. 23, 1958 2 Sheets-Sheet 1
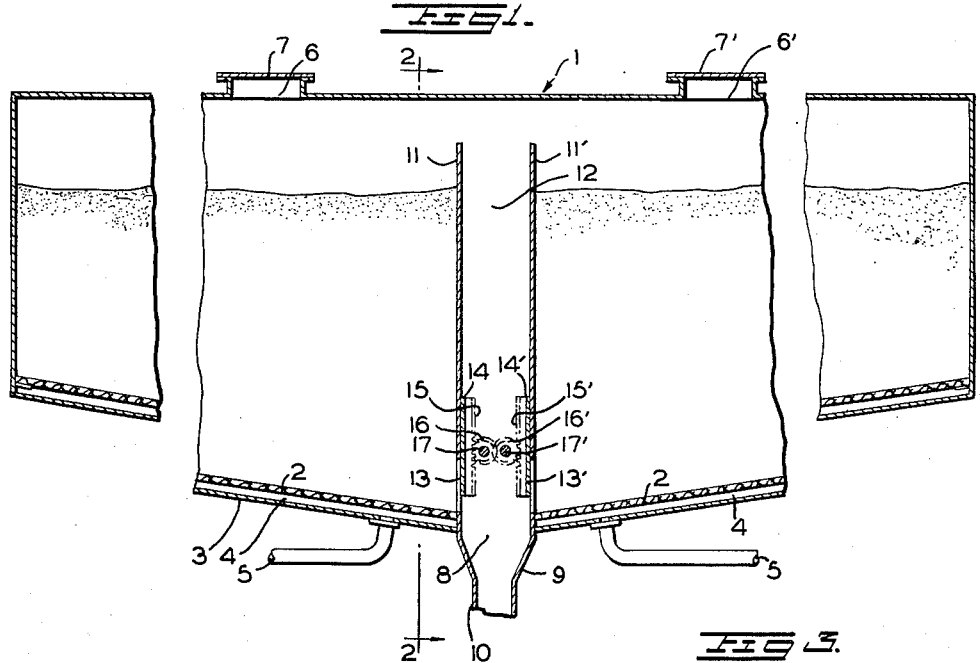
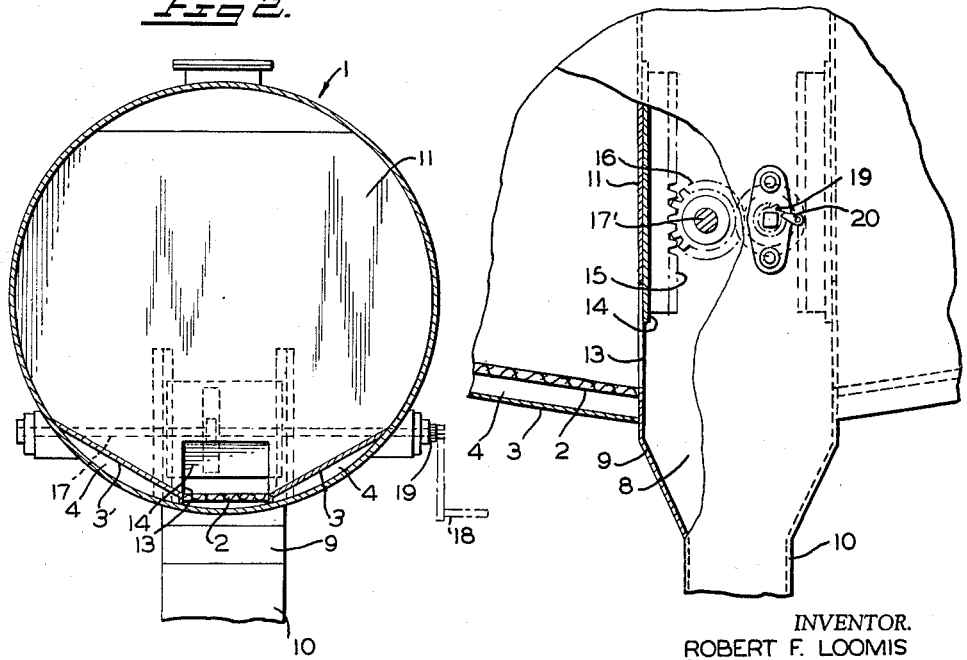
INVENTOR.
ROBERT F. LOOMIS
BY Pennie Edmonds
Morton Barrows & Taylor
ATTORNEYS Dec. 1, 1959   R. F. LOOMIS   2,915,338
CONVEYING APPARATUS
Filed Dec. 23, 1958   2 Sheets-Sheet 2
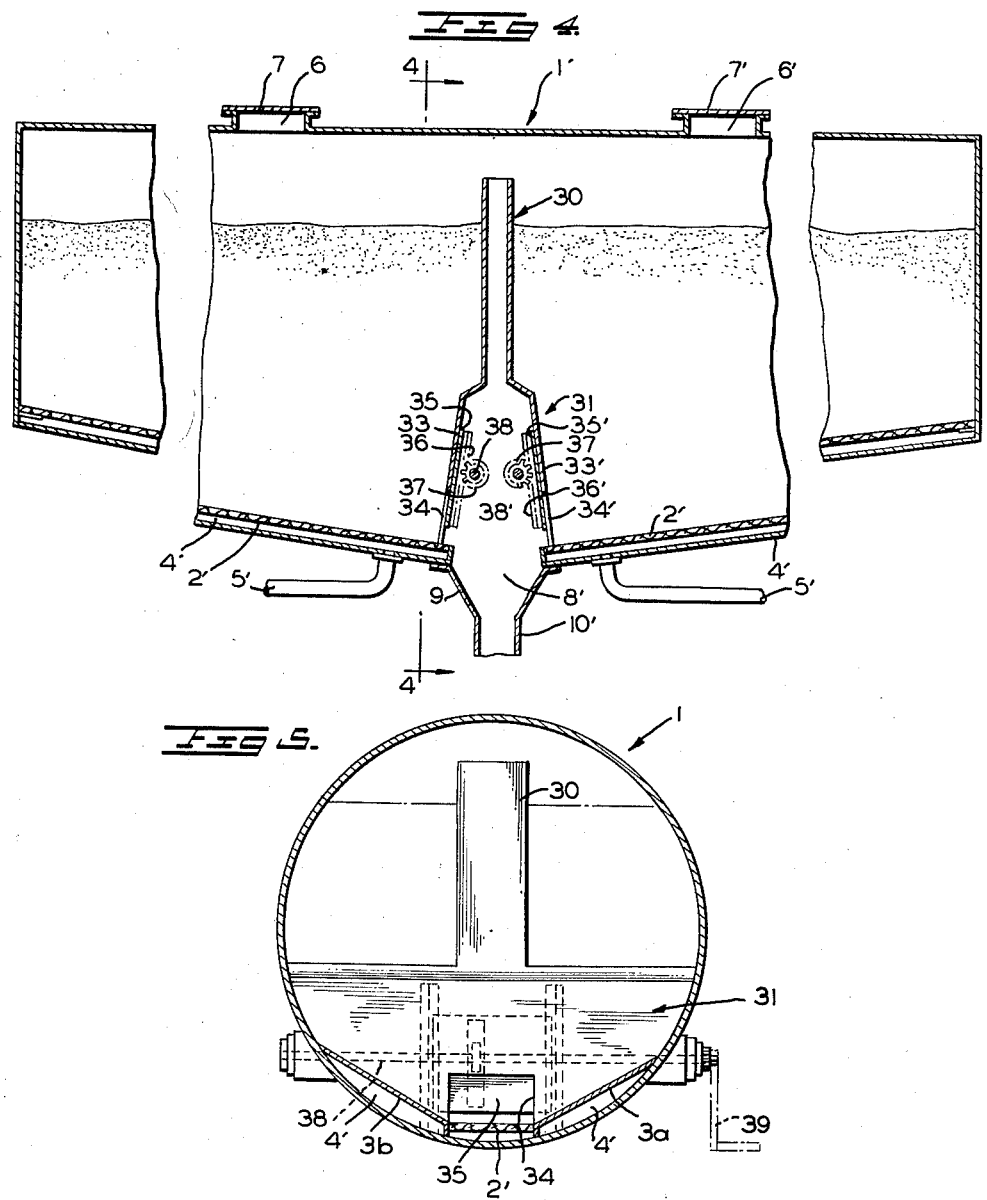
INVENTOR.
ROBERT F. LOOMIS
BY
ATTORNEYS United States Patent Office 2,915,338
Patented Dec. 1, 1959

2,915,338

CONVEYING APPARATUS

Robert F. Loomis, Allentown, Pa., assignor to Fuller Company, a corporation of Delaware Application December 23, 1958, Serial No. 782,435

10 Claims. (Cl. 302—53)

The present invention relates to the conveying of pulverulent material and particularly to a pressurized vessel in which such material may be stored and from which it subsequently may be discharged into a conveying conduit to be carried therethrough by a gas stream.

In my copending application Serial No. 678,798, filed August 19, 1957, now Patent No. 2,891,817, granted June 23, 1959, of which this application is a continuation-in-part, I have disclosed a pressurized vessel for the storage and subsequent discharge of material into a conveying conduit in which the gas for carrying the material through the conveying conduit is taken from the pressure gas in the upper portion of the vessel. The vessel disclosed in that application is elongated in a horizontal direction and has a gas-permeable deck spaced a slight distance from the bottom of the vessel and inclined downwardly towards a discharge outlet at one end of the vessel which communicates with the conveying line. A baffle extends across the end of the vessel having the discharge outlet to hold back the main body of pulverulent material in the vessel. The baffle has an opening adjacent the gas-permeable deck and stops short of the top of the vessel to provide a passage for pressure gas from the upper part of the vessel into the space between the baffle and the adjacent end of the vessel. In operation, gas is introduced into the plenum chamber formed between the bottom of the vessel and the gas-permeable deck and passes upwardly through the deck and into the overlying material, fluidizing the same. The fluidized material flows downwardly along the upper surface of the inclined deck and through the opening in the baffle towards the discharge outlet and connected conveying conduit. Since the vessel is sealed, the gas which passes from the upper surface of the fluidized material builds up a pressure in the upper portion of the vessel and upon continued introduction of the gas, passes through the space above the baffle and downwardly through the space between the baffle and the end wall of the discharge outlet. This downwardly-flowing stream of gas flows over and entrains the material on the lower end of the deck which has passed through the opening in the baffle and carries it in suspension through the conveying conduit to the desired location.

In many instances it is desired to discharge the material from the bottom of a vessel instead of from one end thereof, and preferably from the center of the vessel, which may be horizontally elongated or vertically disposed.

The present invention relates to a conveying system such as is disclosed in my aforesaid application, but which is particularly adapted for vessels having discharge outlets positioned at the center of their bottoms, whether the vessel is of the horizontally-elongated or vertical type.

More particularly, the vessel of the present invention has the gas-permeable deck sloping downwardly in opposite directions towards a centrally-disposed outlet in its bottom, and a gas conduit extends from above the discharge outlet to the upper portion of the vessel. The lower end of the conduit is spaced slightly from the lower end of the inclined deck and the discharge outlet to provide a space for the flow of material from the deck into the discharge outlet. Thus the conduit functions to limit the amount of material which may flow from the deck to the discharge outlet in a manner similar to the baffle of my aforesaid application. The lower end of the gas conduit preferably has adjustable means to control the amount of the pulverulent material which may flow beneath it to the discharge outlet.

Gas passing upwardly through the gas-permeable deck fluidizes the pulverulent material and causes it to flow along the deck towards the central discharge outlet, and the gas after passing through the body of fluidized pulverulent material builds up a gas pressure in the upper part of the vessel. This pressure gas flows downwardly through the gas conduit extending upwardly from just above the discharge outlet and entrains the material flowing from the discharge portion of the gas-permeable deck and carries it in suspension through the discharge outlet and a conveying conduit connected thereto.

The invention will be further described in connection with the accompanying drawings, in which several embodiments of the invention are illustrated, and in which:

Fig. 1 is a vertical sectional view, with parts broken away, showing one embodiment of the invention;

Fig. 2 is a vertical sectional view on line 2—2 of Fig. 1;

Fig. 3 is an enlarged view showing the gate-operating mechanism;

Fig. 4 is a view similar to Fig. 1 showing a different embodiment of the invention; and Fig. 5 is a vertical sectional view on line 4—4 of Fig. 3.

Referring now to the drawings, and first to Figs. 1 to 3, reference character 1 designates a horizontally-elongated vessel for the storage of pulverulent material, such as cement, flour, alumina, chemicals and the like. While the vessel is shown as of cylindrical shape, it may be rectangular or of any other shape. It may be stationary or mobile and form the body of a railway car or of a truck or trailer.

A gas-permeable deck 2 extends along the lower portion of the vessel between a pair of slope sheets 3 and 3' and is spaced a slight distance from the bottom to provide a plenum chamber 4 into which gas under pressure may be introduced through a gas inlet pipe 5. The gas-permeable deck may be of any suitable material having the requisite gas permeability, but preferably is made from multi-ply textile material of the nature of heavy canvas belting.

The top of the vessel has filling openings 6 and 6' which may be sealed by covers 7 and 7', respectively. The bottom of the vessel has a centrally-disposed outlet 8 about which the outlet or transition member 9 is secured. The lower end of the outlet member is connected to a conveying conduit 10 through which material discharged from the vessel may be conveyed to the desired location.

The gas-permeable deck 2 slopes downwardly from each end of the vessel towards the discharge outlet 8, and its lower edge terminates adjacent the outlet so that pulverulent material fluidized on the deck will flow downwardly along its upper surface and flow from its lower end directly through the outlet.

Baffle walls 11 and 11' extend from the sides of the outlet 8 opposite the end walls of the vessel to a position near the top of the vessel. These baffle walls have the shape of the cross-section of the vessel and extend completely across the vessel to provide a central gas conduit 12 communicating with the discharge outlet.

The upper edges of the baffle walls are spaced from the top of the vessel to provide passageways through which pressure gas in each end of the vessel may flow into the gas conduit 12.

The lower edges of the baffle walls are formed with openings or cut-outs 13 and 13' to permit material flowing along the upper surface of the deck to flow therethrough and to pass to the discharge outlet.

The area of the openings 13, 13' through which the pulverulent material may flow is controlled by gates 14 and 14' reciprocably mounted against the inside of the baffle walls 11, 11' forming the gas conduit. The gates have rack bars 15 and 15', the teeth of which mesh with gears 16 and 16' mounted on shafts 17 and 17'. The shafts are mounted in the side walls of the vessel and the shaft 17 extends through the side wall and carries a handle 18 on its outer end portion to enable it to be rotated. The outer end portion of shaft 17 also has a ratchet 19 rigidly secured thereto. A pawl 20 is mounted on the side wall of the vessel in a position to engage the teeth of the ratchet and to lock the shaft against rotation due to the downward force exerted by the gates through the operating gears.

Since the teeth of the rack bars 15, 15' mesh with the teeth at opposite sides of the gears 16, 16', rotation of the shaft 17 in either direction will cause movement of the gates 14, 14' in the same direction. The extent to which the gates are raised or lowered by rotation of the shaft 17 will determine the effective area of the openings 13, 13' which is exposed for the flow of material from the gas-permeable deck through the discharge outlet 8, as well as the amount of material which may be discharged from the vessel in any predetermined time under any set conditions.

In operation, the gates 14, 14' will be adjusted to expose the desired area of the openings 13, 13', and the pawl 20 will be engaged with the ratchet 19 to hold the gates in their adjusted position. Gas, usually air, under suitable pressure and in the desired amount, will be introduced through the gas-inlet pipe 5 into the plenum chamber 4 to flow through the gas-permeable deck 2 into the overlying pulverulent material. The gas fluidizes the pulverulent material and causes it to flow along the upper surface of the deck 2 towards the discharge outlet. The gas passing from the body of fluidized material accumulates in the upper portion of the vessel and flows over the upper edge of the baffle walls 11, 11' and passes, as a flowing stream, downwardly through the gas conduit 12, through the discharge outlet 8, outlet or transition member 9 and into and through a conveying conduit 10. The stream of gas flowing past the lower ends of the gas-permeable deck 2 entrains the pulverulent material flowing from the deck and carries it in suspension through the outlet 8 and the conduit 10 to the desired location.

After the vessel has been discharged of all its contents, the gates 14, 14' will be locked to completely close the openings 13, 13' so that when the vessel is next filled with pulverulent material none of it will flow through the openings until it again is desired to discharge material from the vessel.

The embodiment of the invention disclosed in Figs. 4 and 5 is quite similar to that disclosed in Figs. 1 to 3. The vessel 1', gas-permeable deck 2', slope sheets 3ª and 3ᵇ, plenum chamber 4', gas inlet pipe 5', discharge outlet 8', outlet member 9' and conveyor conduit 10' may be considered as being the same as the corresponding parts of Figs. 1 and 2.

In this form of the invention, the gas conduit 30, instead of being formed by baffle walls which extend the full width of the vessel and nearly to the top thereof, is formed by a box-like housing 31 and a conduit 32 which communicates therewith and extends from the top thereof to a position adjacent the top of the vessel.

The housing extends entirely across the lower portion of the vessel and the side walls 33 and 33' diverge downwardly and their lower ends meet the deck 2' at a position spaced a slight distance from the discharge outlet. The side walls have openings or cut-outs 34 and 34', similar to the openings or cut-outs 13, 13' of the baffle walls 11, 11' of Figs. 1 and 2 to permit material from the deck 2' to flow through them and to be discharged through the outlet 8'.

Gates 35 and 35' are mounted for vertical reciprocable movement against the inside walls 33, 33' of the housing 31. The gates have rack bars 36 and 36', the teeth of which mesh with the teeth of gears 37 and 37'. The gears are mounted on shafts 38 and 38' which extend through one side wall of the vessel. Handles, such as the handle 39, are mounted on the outer ends of the shafts so that the shafts and gears may be rotated to raise or lower the gates to regulate the area of the openings 34, 34' to control the amount of pulverulent material which may flow through the openings to the discharge outlet. The handles may be held against movement under the forces exerted by the weight of the gates by a ratchet and pawl mechanism such as that disclosed in Fig. 3.

The operation of this embodiment of the invention is substantially the same as that of Figs. 1 and 2, except that there is no complete division of the material in the vessel 1' such as is caused by the baffle walls 11, 11' of the vessel 1 of Figs. 1 and 2, and the fluidized material, after passing through the openings 34, 34', does not immediately fall through the discharge outlet 8' but continues over the lower ends of the gas-permeable deck towards the outlet. The pressure gas passing from the upper portion of the vessel downwardly through gas conduit 32 into housing 31 sweeps over the toe of the material still remaining on the lower end of the deck 2' and carries it through the discharge outlet 8', discharge member 9', and through the conveyor conduit 10', in suspension. After the vessel has been completely discharged of the pulverulent material therein, the gates may be lowered to close the openings 34, 34' so that when the vessel subsequently is filled none of the pulverulent material will flow through the openings to the discharge outlet.

Various changes may be made in the details of construction of the conveying apparatus disclosed herein, without sacrificing any of the advantages thereof or departing from the scope of the invention as set forth in the appended claims.

I claim:

1. Apparatus for discharging pulverulent material comprising a vessel having an inlet for pulverulent material, a gas-permeable deck adjacent the bottom of the vessel and having a discharge portion, a plenum chamber beneath the gas-permeable deck, means for introducing gas under pressure into said plenum chamber to pass upwardly through the gas-permeable deck into overlying pulverulent material to fluidize such material, said vessel having a discharge outlet in its bottom, said discharge outlet being located adjacent the discharge portion of the gas-permeable deck and forming the exit for material and gas from the main portion of said vessel, a gas conduit having its lower end above and in vertical alignment with said discharge outlet, the upper end of the gas conduit being open to the space in the upper portion of the vessel for the flow of gas from the upper portion of the vessel into and through said conduit, the lower end portion of said gas conduit forming at least in part a passage for the flow of fluidized material from the gas-permeable deck to said discharge outlet, whereby gas flowing from the upper portion of the container through said gas conduit will entrain material flowing from the gas-permeable deck through said passage and carry it in suspension through the discharge outlet.

2. Apparatus as set forth in claim 1, in which the gas conduit comprises baffle walls extending upwardly from opposite sides of the discharge outlet.

3. Apparatus as set forth in claim 2, in which the baffle walls extend entirely across the vessel.

4. Apparatus as set forth in claim 2, in which the baffle walls each have a material opening extending upwardly from the lower end portions of the gas-permeable deck, and which includes gate means adjustable across the openings in the baffle walls to control the effective area of said openings through which material on the gas-permeable deck may flow.

5. Apparatus as set forth in claim 4, in which the gates are within the gas conduit and are mounted for reciprocable movement against the inside of the baffle walls, and which includes means for reciprocably moving the gates to different positions relative to the material openings in the baffle walls.

6. Apparatus as set forth in claim 5, in which common means are provided for operating both gates.

7. Apparatus as set forth in claim 1, in which the gas conduit includes a housing portion extending across the lower portion of the vessel and over the discharge opening and a conduit portion extending from the top of the housing, at a position over the discharge outlet, to a position at the upper portion of the vessel.

8. Apparatus as set forth in claim 7, in which the lower edges of side walls of the housing are spaced back from the edges of the outlet opening a distance such that portions of the gas-permeable deck extend into the space enclosed by said housing.

9. Apparatus as set forth in claim 7, in which side walls of the housing each have an opening extending upwardly from the gas-permeable deck, and which includes gates mounted on the walls of the housing for reciprocable movement across the openings and operating means for the gates.

10. Apparatus as set forth in claim 1, in which the lower end portion of said conduit is enlarged.

References Cited in the file of this patent

UNITED STATES PATENTS

| | | |
|---|---|---|
| 2,032,367 | Kennedy | Mar. 3, 1936 |
| 2,538,235 | Coffey | Jan. 16, 1951 |
| 2,565,835 | Adams | Aug. 28, 1951 |
| 2,697,653 | Nicholson | Dec. 21, 1954 |
| 2,734,782 | Galle | Feb. 14, 1956 |

FOREIGN PATENTS

| | | |
|---|---|---|
| 751,162 | Great Britain | June 27, 1956 |